United States Patent
Soldati et al.

(10) Patent No.: US 11,039,424 B2
(45) Date of Patent: *Jun. 15, 2021

(54) NETWORK NODE, USER DEVICE AND METHODS THEREOF

(71) Applicant: Huawei Technologies Co., Ltd., Shenzhen (CN)

(72) Inventors: Pablo Soldati, Kista (SE); Alberto Giuseppe Perotti, Segrate (IT); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

This patent is subject to a terminal disclaimer.

(21) Appl. No.: 15/810,388

(22) Filed: Nov. 13, 2017

(65) Prior Publication Data

US 2018/0070346 A1 Mar. 8, 2018

Related U.S. Application Data

(63) Continuation of application No. PCT/EP2015/068596, filed on Aug. 12, 2015.

(30) Foreign Application Priority Data

May 13, 2015 (EP) ..................................... 15167576

(51) Int. Cl.
*H04W 72/04* (2009.01)
*H04L 1/00* (2006.01)
(Continued)

(52) U.S. Cl.
CPC .......... *H04W 72/0406* (2013.01); *H04L 1/00* (2013.01); *H04L 1/0061* (2013.01);
(Continued)

(58) Field of Classification Search
None
See application file for complete search history.

(56) References Cited

U.S. PATENT DOCUMENTS

| 6,871,313 | B2 * | 3/2005 | Gopalakrishnan | .... H04L 1/0072 714/758 |
| 9,166,759 | B2 * | 10/2015 | Li | ........................... H04L 1/004 |

(Continued)

FOREIGN PATENT DOCUMENTS

| CN | 101636995 A | 1/2010 |
| CN | 101646224 A | 2/2010 |

(Continued)

OTHER PUBLICATIONS

Huawei et al., "Candidate schemes for superposition transmission," 3GPP TSG RAN WG1#80b, R1-151848, Belgrade, Serbia, Apr. 20-24, 2015, 11 pages.

(Continued)

*Primary Examiner* — Willie J Daniel, Jr.
(74) *Attorney, Agent, or Firm* — Slater Matsil, LLP

(57) ABSTRACT

A network node and a user device are provided. The network node comprises a processor to determine for each of the plurality of user devices a corresponding check element position of a corresponding check element in a control information message addressed to the user device; a transmitter to transmit a first control signal (CS1) to each of the plurality of user devices, the CS1 indicating the determined corresponding check element position. The user device comprising: a receiver to receive a CS1 indicating a corresponding check element position of a check element associated with the user device in a control information message (M), the control information message (M) comprising control information (d) and at least two check elements, a processor to derive the corresponding check element posi- (Continued)

tion of the check element associated with the user device from the CS1.

18 Claims, 8 Drawing Sheets

(51) Int. Cl.
*H04W 4/08* (2009.01)
*H04W 8/22* (2009.01)
*H04W 24/10* (2009.01)
*H04W 8/26* (2009.01)
*H04W 8/00* (2009.01)

(52) U.S. Cl.
CPC ............ *H04L 1/0072* (2013.01); *H04W 4/08* (2013.01); *H04W 8/22* (2013.01); *H04W 24/10* (2013.01); *H04L 2001/0093* (2013.01); *H04W 8/005* (2013.01); *H04W 8/26* (2013.01)

(56) References Cited

U.S. PATENT DOCUMENTS

| | | | |
|---|---|---|---|
| 10,070,306 B2 | 9/2018 | Soldati et al. | |
| 10,506,561 B2 * | 12/2019 | Soldati | H04W 4/08 |
| 2008/0232449 A1 | 9/2008 | Khan et al. | |
| 2008/0259784 A1 | 10/2008 | Allan et al. | |
| 2009/0197630 A1 | 8/2009 | Ahn et al. | |
| 2010/0251083 A1 | 9/2010 | Cho et al. | |
| 2011/0194511 A1 | 8/2011 | Chen et al. | |
| 2011/0216677 A1 | 9/2011 | Admadi et al. | |
| 2012/0190377 A1 | 7/2012 | Li et al. | |
| 2012/0195267 A1 | 8/2012 | Dai | |
| 2013/0040619 A1 | 2/2013 | Grube et al. | |
| 2014/0254461 A1 | 9/2014 | Li et al. | |
| 2014/0313994 A1 | 10/2014 | Su et al. | |
| 2016/0065346 A1 | 3/2016 | Yang et al. | |
| 2017/0127272 A1 | 5/2017 | Kela et al. | |
| 2017/0251343 A1 | 8/2017 | Robbins et al. | |
| 2017/0339534 A1 | 11/2017 | Bhalla | |

FOREIGN PATENT DOCUMENTS

| | | |
|---|---|---|
| CN | 101651995 A | 2/2010 |
| CN | 102055552 A | 5/2011 |
| CN | 102362526 A | 2/2012 |
| CN | 102835085 A | 12/2012 |
| CN | 103493451 A | 1/2014 |
| CN | 103702405 A | 4/2014 |
| CN | 103929287 A | 7/2014 |
| CN | 104054364 A | 9/2014 |
| JP | 2014176091 A | 9/2014 |
| JP | 2015073293 A | 4/2015 |

OTHER PUBLICATIONS

Institute for Information Industry (III), "Discussion on downlink control channel for multiuser superposition transmission," 3GPP TSG RAN WG1 Meeting #80b, R1-151974, Belgrade, Serbia, Apr. 20-24, 2015, 3 pages.

Sharp, "Method to identify L1/L2 control signalling formats for scheduling," 3GPP TSG-RAN WG2#56-bis, R2-070233, Sorrento, Italy, Jan. 15-19, 2007, 5 pages.

LG Electronics, "Discussion on multiuser superposition schemes and signaling schemes," 3GPP TSG RAN WG1 Meeting #82, R1-154282, Beijing, China, Aug. 24-28, 2015, 4 pages.

* cited by examiner

200

202 — Determining for each of the plurality of user devices a corresponding check element position of a corresponding check element in a control message addressed to the user device 204 — Transmitting a first control signal CS1 to each of the plurality of user devices, the first control signal CS1 indicating the determined corresponding check element position 206 — Composing a control message M addressed to at least two user devices 300a,...,300z of the plurality of user devices by generating for each of the at least two user devices 300a,...,300z a corresponding check element based on control information d and the identity $i_z$ of the user device, and by appending the generated check elements to the control information d in dependence on their determined corresponding check element position 208 — Transmitting the control message M to the at least two user devices 300a,...,300z

Fig. 2

NETWORK NODE, USER DEVICE AND METHODS THEREOF

CROSS-REFERENCE TO RELATED APPLICATIONS

This application is a continuation of International Application No. PCT/EP2015/068596, filed on Aug. 12, 2015, which claims priority to European Patent Application No. EP15167576.6, filed on May 13, 2015. The disclosures of the aforementioned applications are hereby incorporated by reference in their entireties.

TECHNICAL FIELD

The present invention relates to a network node and a user device. Furthermore, the present invention also relates to corresponding methods, a computer program, and a computer program product.

BACKGROUND

The downlink of the 3GPP Long Term Evolution (LTE) cellular communication system is based on Orthogonal Frequency Division Multiplex (OFDM) transmission, which uses time and frequency resource units for transmission. The smallest time-frequency resource unit, called resource element (RE), consists of a single complex sinusoid frequency (sub-carrier) in an OFDM symbol. For the purpose of scheduling transmissions to the different user equipments (UEs), the resource elements are grouped into larger units called physical resource blocks (PRBs). A PRB occupies a half of a subframe, called "slot", consisting of six or seven consecutive OFDM symbol intervals in time domain (0.5 milliseconds in total), and twelve consecutive sub-carrier frequencies in the frequency domain (180 kHz in total).

Downlink (and uplink) transmissions in LTE occur in an orthogonal manner, i.e., in each downlink (/uplink) subframe users are scheduled to receive (/transmit) in orthogonal radio resources by being granted access to non-overlapping sets of physical resource blocks. The downlink of the 3GPP LTE-A system also supports multi-user multiple-input-multiple-output (MU-MIMO) transmission, where a set of users are orthogonally multiplexed in different antenna spatial layers (corresponding to orthogonal radio channels) while being granted access to the same set of time-frequency resources. In this way, more users can be simultaneously served by the base station. Additional non-orthogonal multiple access schemes for LTE-A are currently being investigated by the 3GPP standardization body.

Downlink (/uplink) transmission grants in the LTE system are assigned to the UEs by means of scheduling grants transmitted in one of the downlink control channels provided by LTE: the Physical Downlink Control Channel (PDCCH) and the Enhanced PDCCH (a.k.a. EPDCCH). The PDCCH is transmitted in a control region that can occupy up to three OFDM symbols at the beginning of each subframe, whereas the remaining part of the subframe forms the data region used for the transmission of the Physical Downlink Shared Channel (PDSCH). EPDCCH, on the other hand, consists of a UE-specific control channel configured via higher layer Radio Resource Control (RRC) signaling within the PDSCH resources (i.e., PRB pairs). A UE can be configured to search for UE-specific control information either in the PDCCH region or in the EPDCCH region, while the PDCCH region is monitored to receive control information common to all users connected to a cell.

Both PDCCH and EPDCCH support unicast transmission of control information for various purposes, including dynamic scheduling assignment in downlink and uplink. In addition, PDCCH supports static multicast transmission of common control information, where a plurality of UEs are statically or semi-statically (i.e., for hundreds of transmission time interval (TTIs)) grouped by the network and assigned, for instance, a common Radio Network Temporary Identifier (RNTI) to decode the control information addressed to the group. As the legacy LTE system schedules UEs to access to orthogonal (hence different) radio resources, dynamic multicast transmission of control information to sets of users created on a TTI-basis is not supported.

SUMMARY

An objective of embodiments of the present invention is to provide a solution which mitigates or solves the drawbacks and problems of conventional solutions.

An "or" in this description and the corresponding claims is to be understood as a mathematical OR which covers "and" and "or", and is not to be understood as an XOR (exclusive OR).

The above objective and further objectives are solved by the subject matter of the independent claims. Further advantageous implementation forms of the present invention can be found in the dependent claims.

According to a first aspect of the embodiments of the present invention, the above mentioned and other objectives are achieved with a network node for providing control information messages to a plurality of user devices. The network node comprises a processor, configured to: determine for each of the plurality of user devices a corresponding check element position of a corresponding check element in a control information message addressed to the user device. The network node further comprises a transmitter configured to: transmit a first control signal to each of the plurality of user devices, the first control signal indicating the determined corresponding check element position. The processor is further configured to compose a control information message addressed to at least two user devices of the plurality of user devices by generating for each of the at least two user devices a corresponding check element based on control information and the identity of the user device, and by appending the generated check elements to the control information in dependence on their determined corresponding check element position. The transmitter is further configured to transmit the control information message to the at least two user devices.

A check element can for example be a Cyclic Redundancy Check (CRC) check word, also known as a CRC code word or simply a CRC.

Further, the identity of a user device is also known as user device identity information or user device identifier or user device identity, or user address, e.g. a Radio Network Temporary Identifier (RNTI).

The present network node according to the first aspect provides a number of advantages over conventional solutions.

An advantage of the present network node according to the first aspect is to provide improved (multicast) control signaling to at least two user devices simultaneously. Thereby, the control information message can be seen as a multicast control information message. The present network node according to the first aspect accommodates the identities to at least two user devices in a control information message by means of individual check elements in a way that each recipient user device does not need to know the identity of the other user devices. Compared to conventional solutions, the network node according to the first aspect enables to address a multicast control information message to at least two user devices formed in a dynamic manner prior to transmitting the multicast control information message, e.g., on a transmission time interval basis. Therefore, reduced control signaling overhead, with respect to conventional solutions when addressing at least two user devices with a single control information message, is achieved with the present network node e.g. by sending the common control information only once.

A further advantage is that in order to detect the multicast control information message, a user device does not need to refer to any user device common information (such as a common RNTI) nor does it need to know the identities or check elements of the other user devices addressed by the control information message.

Moreover, the present solution has the benefit of keeping the number of blind detection per user device for a multicast control information message the same as the number of blind decoding attempts in the case of a unicast control information message when each user device knows its corresponding check element location.

In a first possible implementation form of a network node according to the first aspect, the processor is further configured to determine the same corresponding check element position for a group of user devices of the plurality of user devices, compose each control information message such that each user device addressed by the control information message has a different corresponding check element position.

The first possible implementation form has the advantage of efficiently partition a plurality of user devices into multiple groups, with all user devices comprised in a group of user devices being semi-statically configured to read the same corresponding position of a check element in a multicast control information message. The first possible implementation form has the additional advantage of enabling the network node to form a control information message that efficiently addresses multiple user devices simultaneously, i.e. a multicast control information message, by e.g. sending the common control information only once, without requiring a group user device common identity. Furthermore, it can be avoided that in one and the same control information message two user devices are addressed having the same corresponding check element position.

In a second possible implementation form of a network node according to the first possible implementation form of the first aspect, the processor further is configured to select the group of user devices of the plurality of user devices based on the radio channel properties (or radio environment properties) including one or more of: the signal-to-noise ratio, signal-to-noise and interference ratio, propagation loss, signal-to-leakage and noise ratio, and received signal strength.

However also other criteria, such as estimated distance to the network nodes, scheduling metrics, expected throughput, latency, etc. can be used for forming the group of user devices.

The second possible implementation form has the advantage that a plurality of user devices can be efficiently partitioned into different partitions based on different criteria, thereby making the present solution suitable to support various data transmission and scheduling schemes.

In a third possible implementation form of a network node according to the second possible implementation form of the first aspect, the processor further is configured to select the group of user devices of the plurality of user devices by using thresholds related to the radio channel properties (or radio environment properties).

The third possible implementation form has the advantage a plurality of user devices can be efficiently partitioned into different partitions using low complexity algorithms based on thresholds related to the radio channel properties (or radio environment properties).

In an example of the network node according to the third possible implementation form, the processor further is configured to select the group of user devices such that a corresponding signal-to-noise ratio or signal-to-noise and interference ratio either exceed or is below a threshold.

In another example of the network node according to the third possible implementation form, the processor further is configured to select the group of user devices such that a corresponding received signal strength either exceed or is below a threshold.

In yet another example of the network node according to the third possible implementation form, the processor further is configured to select the group of user devices such that a corresponding propagation loss either exceed or is below a threshold.

In a fourth possible implementation form of a network node according to any of the first to third possible implementation forms of the first aspect, the processor is further configured to determine a group common identity for the group of user devices; wherein the transmitter is further configured to transmit a second control signal to at least one user device of the group of user devices, the second control signal indicating the group common identity, transmit the first control signal to at least one user device of the group of user devices based on the group common identity.

The fourth possible implementation form has the advantage of efficiently configuring a group of user devices (forming a partition of the plurality of user devices) with a group common identity, such as a group common RNTI, by means of a second control signal indicating the group common identity. The fourth possible implementation of the first aspect has the additional advantage of efficiently configuring the group of user devices with the same corresponding position of a check element in a multicast control information message by means of a first control signal based on the group common identity. The first and the second control signals may be a higher Radio Resource Control (RRC) signal.

In a fifth possible implementation form of a network node according to any of the first to fourth possible implementation forms of the first aspect or the first aspect as such, the processor is further configured to determine the same corresponding check element position for a first user device and a second user device, compose a first control information message addressed to the first user device and at least one third user device having a different corresponding check element position than the first user device, compose a second control information message addressed to the second user device and at least one fourth user device having a different corresponding check element position than the second user device; wherein the transmitter further is configured to transmit the first control information message and the second control information message using different radio resources.

This means that radio resources for the first control information message and the second control information message should not collide. For example radio resources orthogonal in time and frequency could be used. Also orthogonal codes could be used in this respect.

The fifth possible implementation form has the advantage that multiple multicast control information messages, i.e., control information messages addressing two or more user devices at once, can be efficiently transmitted by means of orthogonal radio resources. Furthermore, the fifth possible implementation form has the advantage that user devices being configured to read the same corresponding check element position in a multicast message are efficiently addressed (by the network node).

In a sixth possible implementation form of a network node according to any of the preceding possible implementation forms of the first aspect or to the first aspect as such, the processor further is configured to generate the check element for each of the at least two of user devices based on the identity of the user device, the control information, and check elements in the control information message prior to the check element for the user device.

The sixth possible implementation form has the advantage that the check elements are computed on continuous segments of bits in the control information message, therefore simple detection algorithms can be used by the user device to detect whether a multicast control information message is addressed to the user device or not.

In a seventh possible implementation form of a network node according to any of the preceding possible implementation forms of the first aspect or to the first aspect as such, the control information comprises any of common control information for the at least two user devices and user device specific control information for at least one user device of the at least two of user devices.

The seventh possible implementation form has the advantage that the control information message can be used to transmit also user device specific control information, thereby avoiding transmission of additional unicast control information messages with the user device specific control information for each user device. Thereby, control signaling overhead can be reduced compared to conventional solutions for transmitting control information to multiple user devices.

In an eight possible implementation form of a network node according to the seventh possible implementation form of the first aspect, the processor further is configured to generate a check element for each of the at least two user devices based on the identity of the user device and any of the common control information and the user device specific control information.

The eight possible implementation form has the advantage that the check element corresponding to each user device can be efficiently generated based only on the control information corresponding to the user device and the identity of the user device.

In a ninth possible implementation form of a network node according to the second possible implementation form of the first aspect, the transmitter further is configured to transmit the first control signal in the same time and frequency radio resources to each of the plurality of user devices.

The ninth possible implementation form has the advantage that the control signaling overhead is reduced with respect to conventional solutions when addressing a group of user devices with the control information message.

In a tenth possible implementation form of a network node according to any of the preceding possible implementation forms of the first aspect or to the first aspect as such, the processor further is configured to select the at least two user devices based on the radio channel properties including one or more of: the signal-to-noise ratio, signal-to-noise and interference ratio, propagation loss, signal-to-leakage and noise ration, and received signal strength.

The tenth possible implementation form has the advantage that user devices addressed by a multicast control information message can be selected based on different criteria, thereby making the present solution suitable to support various data transmission and scheduling schemes.

In an eleventh possible implementation form of a network node according to any of the preceding possible implementation forms of the first aspect or to the first aspect as such, the indication of the position of a corresponding check element is represented as any of bitmaps and bit offset positions with respect to a common bit reference position.

The eleventh possible implementation form has the advantage that the control signaling overhead is reduced with respect to conventional solutions when configuring a group of user devices with the same corresponding position of a check element in a multicast control information message.

In a twelfth possible implementation form of a network node according to any of the preceding possible implementation forms of the first aspect or to the first aspect as such, the at least two user devices comprise user devices selected for multiuser superposed transmission or reception of data channel in a common set or in overlapping set of time and frequency resources.

The twelfth possible implementation form has the advantage that control information for at least two user devices configured for multiuser superposed transmission or reception of data channel can be signaled with reduced signaling overhead compared to conventional solutions.

According to a second aspect of the embodiments of the present invention, the above mentioned and other objectives are achieved with a user device for a wireless communication system. The user device comprises a receiver configured to receive a first control signal indicating a corresponding check element position of a check element associated with the user device in a control information message, the control information message comprising control information and at least two check elements. The user device also comprises a processor configured to derive the corresponding check element position of the check element associated with the user device from the first control signal. The receiver further is configured to receive the control information message. The processor further is configured to perform a redundancy check on the control information message based on the derived corresponding check element position, derive the control information from the control information message upon a positive redundancy check, and communicate in the wireless communication system based on the derived control information.

It should be noted that a check element can be distributed over several separate positions in the control information message. Hence, each check element may have a plurality of check element positions. The plurality of check element positions may be determined by the network node according to the first aspect; and indicated in the first control signal, and derived and used by the user device for deriving the control information.

Distributing a check element over multiple positions provides to the control information message transmission increased robustness to common wireless channel degradations like frequency-selective and/or time-selective fading. Furthermore, having a receiver capable of checking multiple check element positions allows the user device to be included in multiple user device groups at the same time, thereby allowing increased flexibility and/or shorter time for the reconfiguration of transmission parameters.

The present user device according to the second aspect provides a number of advantages over conventional solutions.

An advantage is that the user device of the second aspect provides a solution for efficiently receiving, detecting, and decoding of multicast downlink control signal addressed to at least two user devices dynamically selected, e.g., on a transmission time interval basis, etc.

Furthermore, a user device receiving a control information message addressed to at least two user devices can perform efficient blind check decoding based on the corresponding check element position in the control information message.

Moreover, the present solution has the benefit of keeping the number of blind detection per user device for a multicast control information message the same as the number of blind decoding attempts in the case of a unicast control information message when each user device knows its corresponding check element location. Additionally, the present solution has the advantage of enabling dynamic user device grouping on a TTI basis prior to transmitting a multicast control information message.

In a first possible implementation form of a user device according to the second aspect, the processor further is configured to derive any of common control information for a plurality of user devices and user device specific control information for the user device comprised in the control information.

Optionally, the first possible implementation form of the user device also includes discarding user device specific control information of other user devices and discarding check elements corresponding to other check element positions in the control information message.

The first possible implementation form has the advantage that the user device retrieves the control information from common control information that is multicast to multiple user devices, thereby making efficient use of the transmission resources dedicated to the transmission of control information.

In a second possible implementation form of a user device according to the first possible implementation form of the second aspect or to the second aspect as such, the receiver further is configured to receive a second control signal indicating a group common identity for a group of user devices, the user device being comprised in the group of user devices, wherein the processor further is configured to derive the group common identity for a group of user devices from the second control signal, derive the corresponding check element position of the check element associated with the user device in the control information message from the first control signal based on the derived group common identity.

The second possible implementation form has the advantage that the user device is efficiently configured with a corresponding check element position of a check element associated with the user device in the control information message upon receiving a first control signal addressed to a group of user devices by means of a group common identity. Thereby, the present implementation form achieves a reduced signaling overhead with respect to conventional solutions for unicast-transmitting control information to multiple user devices separately.

In a third possible implementation form of a user device according to the any of the preceding possible implementation forms of the second aspect or to the second aspect as such, the processor further is configured to perform the redundancy check on the control message based on the identity of the user device, the control information in the control information message, and the corresponding check element position for the user device (and independent of the check elements for other user devices addressed by the control information message).

The third possible implementation form has the advantage of reducing the computational complexity of performing the redundancy check on the received multicast control information message. Thereby, the third implementation form achieves reduced energy consumption at the user device while enabling the user device to rapidly detect a multicast control information message. Especially, the present possible implementation form has the advantage of having the same encoding complexity for all check elements, therefore the check element encoding complexity is independent of the number of user devices addressed by the control information message. Moreover, as long as the data word and the user device identities of all user devices addressed by the control information message are available at the same time in the network node, the present possible implementation form has the advantage of permitting computation of check elements in parallel, thereby avoiding delays due to sequential check element generation as required by other possible implementation forms.

In a fourth possible implementation form of a user device according to the any of the preceding possible implementation forms of the second aspect or to the second aspect as such, the processor further is configured to perform the redundancy check on the control information message based on the corresponding check element position for the user device, the identity of the user device, and all control information and check elements in the control information message prior to the check element associated with the user device.

The fourth possible implementation form has the advantage that the user device can perform blind check decoding by continuously streaming the control information message. Thereby, low complexity redundancy check schemes can be adopted to detect a multicast control information message.

According to a third aspect of the embodiments of the present invention, the above mentioned and other objectives are achieved with a method for a network node for providing control information messages to a plurality of user devices. The method comprises determining for each of the plurality of user devices a corresponding check element position of a corresponding check element in a control information message addressed to the user device. The method also includes transmitting a first control signal to each of the plurality of user devices, the first control signal indicating the determined corresponding check element position. The method also includes composing a control information message addressed to at least two user devices of the plurality of user devices by generating for each of the at least two user devices a corresponding check element based on control information and the identity of the user device, and by appending the generated check elements to the control information in dependence on their determined corresponding check element position. The method also includes transmitting the control information message to the at least two user devices.

In a first possible implementation form of a method according to the third aspect, the method further comprises determining the same corresponding check element position for a group of user devices of the plurality of user devices, composing each control information message such that each user device addressed by the control information message has different corresponding check element position.

In a second possible implementation form of a method according to the first possible implementation form of the third aspect, the method further comprises selecting the group of user devices of the plurality of user devices based on the radio channel properties including one or more of: the signal-to-noise ratio, signal-to-noise and interference ratio, propagation loss, signal-to-leakage and noise ratio, and received signal strength.

In a third possible implementation form of a method according to the second possible implementation form of the third aspect, the method further comprises selecting the group of user devices of the plurality of user devices by using thresholds related to the radio channel properties.

In a fourth possible implementation form of a method according to any of the first to third possible implementation forms of the third aspect, the method further comprises determining a group common identity for the group of user devices; transmitting a second control signal to at least one user device of the group of user devices, the second control signal indicating the group common identity, transmitting the first control signal to at least one user device of the group of user devices based on the group common identity.

In a fifth possible implementation form of a method according to any of the first to fourth possible implementation forms of the third aspect, the method further comprises determining the same corresponding check element position for a first user device and a second user device, composing a first control information message addressed to the first user device and at least one third user device having a different corresponding check element position, composing a second control information message addressed to the second user device and at least one fourth user device having a different corresponding check element position, transmitting the first control information message and the second control information message using different radio resources.

In a sixth possible implementation form of a method according to any of the preceding possible implementation forms of the third aspect or to the third aspect as such, the method further comprises generating the check element for each of the at least two of user devices based on the identity of the user device, the control information, and check elements in the control information message prior to the check element for the user device.

In a seventh possible implementation form of a method according to any of the preceding possible implementation forms of the third aspect or to the third aspect as such, the control information comprises any of common control information for the at least two user devices and user device specific control information for at least one user device of the at least two of user devices.

In an eight possible implementation form of a method according to the seventh possible implementation form of the third aspect, the method further comprises generating a check element for each of the at least two user devices based on the identity of the user device and any of the common control information and the user device specific control information.

In a ninth possible implementation form of a method according to the second possible implementation form of the third aspect, the method further comprises transmitting the first control signal in the same time and frequency radio resource to each of the plurality of user devices.

In a tenth possible implementation form of a method according to any of the preceding possible implementation forms of the third aspect or to the third aspect as such, the method further comprises selecting the at least two user devices based on the radio channel properties including one or more of: the signal-to-noise ratio, signal-to-noise and interference ratio, propagation loss, signal-to-leakage and noise ration, and received signal strength.

In an eleventh possible implementation form of a method according to any of the preceding possible implementation forms of the third aspect or to the third aspect as such, the indication of position of a corresponding check element is represented as any of bitmaps and bit offset positions with respect to a common bit reference position.

In a twelfth possible implementation form of a method according to any of the preceding possible implementation forms of the third aspect or to the third aspect as such, the at least two user devices comprises user devices selected for concurrent transmission or reception in a common set or in overlapping set of time and frequency resources.

According to a fourth aspect of the embodiments of the present invention, the above mentioned and other objectives are achieved with a method for a user device for a wireless communication system. The method comprises receiving a first control signal indicating a corresponding check element position of a check element associated with the user device in a control information message, the control information message comprising control information and at least two check elements. The method also comprises deriving the corresponding check element position of the check element associated with the user device from the first control signal. The method also comprises receiving the control information message. The method also comprises performing a redundancy check on the control information message based on the derived corresponding check element position. The method also comprises deriving the control information from the control information message upon a positive redundancy check. The method also comprises communicating in the wireless communication system based on the derived control information.

In a first possible implementation form of a method according to the fourth aspect, the method further comprises deriving any of the common control information for a plurality of user devices and user device specific control information for the user device comprised in the control information.

In a second possible implementation form of a method according to the first possible implementation form of the fourth aspect or to the fourth aspect as such, the method further comprises receiving a second control signal indicating a group common identity for a group of user devices, the user device being comprised in the group of user devices, deriving the group common identity for a group of user devices from the second control signal, deriving the corresponding check element position of the check element associated with the user device in the control information message from the first control signal based on the derived group common identity.

In a third possible implementation form of a method according to the any of the preceding possible implementation forms of the fourth aspect or to the fourth aspect as such, the method further comprises performing the redundancy check on the control information message based on the identity of the user device, the control information in the control information message, and the corresponding check element position for the user device.

In a fourth possible implementation form of a method according to the any of the preceding possible implementation forms of the fourth aspect or to the fourth aspect as such, the method further comprises performing the redundancy check on the control information message based on the corresponding check element position for user device, the identity of the user device, and all control information and check elements in the control information message prior to the check element associated with the user device.

The advantages of any method according to the third and fourth aspects are the same as those for the network nodes and user device according to the first and second aspects, respectively.

The embodiments of the present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which:

FIG. 2 shows a method according to an embodiment of the present invention;

DETAILED DESCRIPTION OF ILLUSTRATIVE EMBODIMENTS

Figure 1:
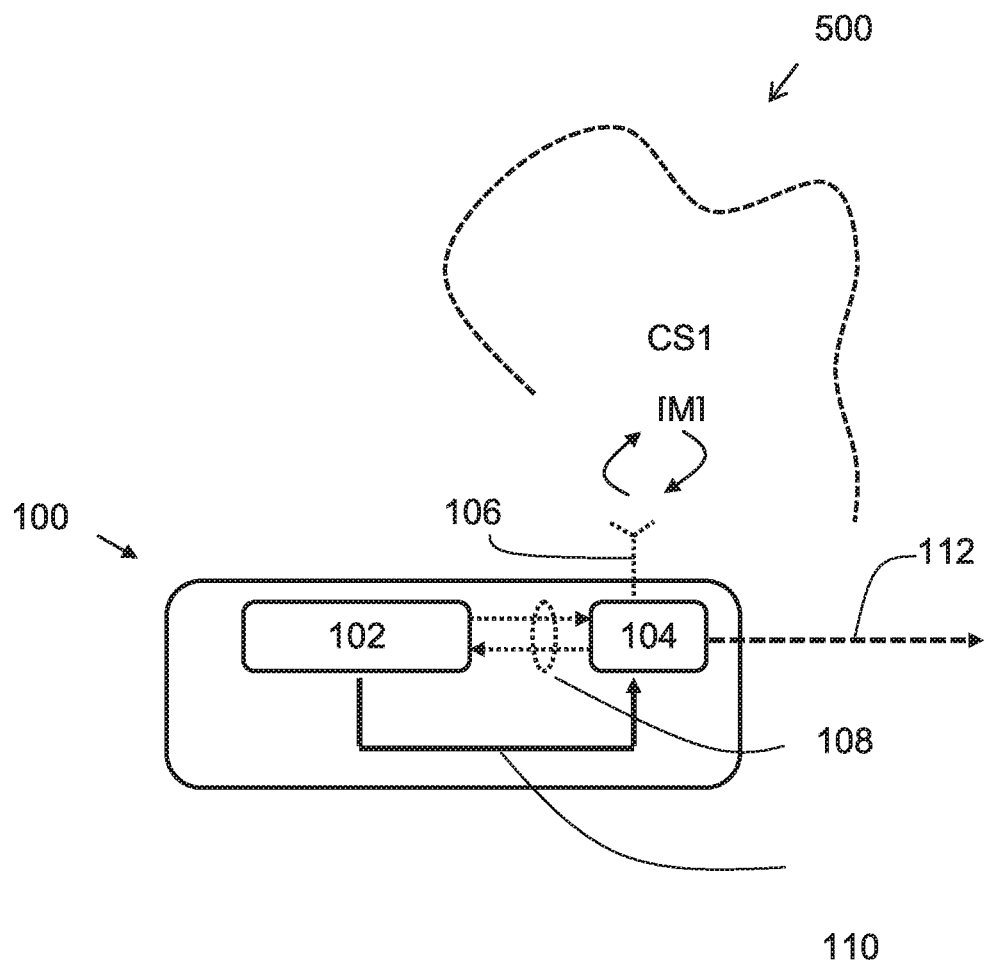
FIG. 1 shows a network node according to an embodiment of the present invention.

Recent advances in radio communications have revived the interest in non-orthogonal multiple access (MA) schemes, wherein at least two UEs are dynamically scheduled on a TTI-basis to receive (in downlink) or to transmit (in uplink) data streams in the same set of time-frequency resources (i.e., resource blocks (RB), groups of resource blocks (RBG), sub-band) or in partially overlapping sets thereof. Examples of these techniques include Low-Density Spread multiple access (LDS), Constellation Expansion Multiple Access (CEMA) and its version with adaptive rate (RA-CEMA), Semi-Orthogonal Multiple Access (SOMA), the NTT Non-Orthogonal Multiple Access (NOMA) scheme, etc. While these techniques can improve the spectral efficiency of the data channel, adopting unicast transmission of control information may easily saturate the capacity of the control channel due to the increased number of scheduled users per TTI. On the other hand, a large portion of the control information, such as the allocation of radio resources, is common to all UEs in a group of UEs scheduled to receive (in downlink) or to transmit (in uplink) data streams in the same set of time-frequency resources. The portion of control bits reserved in the LTE Downlink Control Information (DCI) formats to the allocation of resource blocks can reach up to 59% of the entire DCI. With the evolution of 5 G networks, where larger carrier bandwidths are predicted to reach up to 200 MHz or multiple wideband component carriers are aggregated, the RBs field of the control information will occupy even a more significant portion of the DCI. In NOMA/SOMA/REMA, if we can send the RBs or other common control information only once to the scheduled UEs, the whole control overhead will be significantly reduced. In this context, it has been realized that dynamic multicast transmission of control information, i.e., addressing simultaneously multiple UEs scheduled on a TTI basis through a common DCI or search space, can bring significant signaling overhead reduction and enable more advanced data transmission methods.

In LTE radio networks, a DCI is transmitted to a UE in a DCI packet (i.e., a control information message or control message) containing control information data d followed by a Cyclic Redundancy Check (CRC) word c. Such CRC word c is computed as a function of the information bits d and of an identifier $i_z$ of the recipient UE. According to a typical LTE configuration, a W-bit CRC is computed using a W-bit shift-register whose initial content is set to a fixed value. The W-bit CRC word is then bitwise added modulo-2 to the user identifier of the addressed UE to obtain $$c_1 = CRC(d; i_1)$$

where $i_1$ is the UE identifier (e.g., the RNTI) of the recipient UE.

If the same control information d has to be sent to a second UE whose identifier is $i_2$, a second control information packet is formed by appending a new CRC word $$c'_2 = CRC(d; i_2).$$

to the control information d and is transmitted to the second UE. It is intended that the aforementioned W-bit CRC word can be computed using a CRC or any other kind of error-detection code. It appears evident that is not convenient to send a second control information packet containing the same control information d to multiple UEs.

Instead, embodiments of the present invention propose a new solution for encoding the identities of multiple UEs to whom a multicast control message is addressed in the control message itself. According to the new solution, the identities of all the UEs are accommodated in the DCI packet by means of individual check elements in a way that each recipient UE, in order to detect the multicast DCI packet, does not need to refer to any UE common information (e.g., a common UE identity or a common check element) nor does it need to know the identities or check elements of the other UEs addressed by the control message. The UE identifiers utilized to generate each check element within the multicast control message may consist, for example, of a UE RNTI as defined by the LTE system or a portion of a UE RNTI.

Therefore, embodiments of the present invention relate to a network node and a user device and corresponding methods. In the present disclosure embodiments of the present invention are mainly described in a LTE system context. Hence, LTE terminology, system concepts, etc. are used. It should however be understood that the present solution is not limited to such LTE system and can be applied in any suitable wireless communication system. Hence, in the following described embodiments the term user device and UE are both used interchangeable in this disclosure. Further, the present control (information) message M corresponds to DCI or DCI packet in LTE system. An identity of a user device corresponds to e.g. a RNTI in LTE systems. A check element in the following disclosure is implemented as a Cyclic Redundancy Check (CRC) check word also known as a CRC code word or simply a CRC.

FIG. 1 shows a network node 100 according to an embodiment of the present invention. The network node 100 comprises a processor 102 which is communicably coupled with communication means 108 to a transmitter 104 in this exemplary embodiment. The communication means 108 are illustrated as dotted arrows between the processor 102 and the transmitter 104 in FIG. 1. The communication means 108 are according to techniques well known in the art. The communication means 108 may e.g. be used for transfer of data or control signaling between the processor 102 and the transmitter 104. The network node 100 in this particular embodiment further comprises control means no by which the processor 102 operates (or controls) the transmitter 104. The control means are illustrated with the arrow from the processor 102 to the transmitter 104. The network node 100 also comprises antenna means 106 coupled to the transmitter 104 for transmission in the wireless communication system 500. Optionally, the transmitter 104 may be part of a transceiver for reception and transmissions in the wireless communication system 500, which is illustrated in the embodiment in FIG. 1. The network node 100 may also optionally have wired communication means 112 by which the network node 100 can communicate with other network nodes or other network entities, such as radio network controllers, etc.

According to the present solution, the processor 102 of the network node 100 is configured to determine for each of a plurality of user devices a corresponding check element position of a corresponding check element in a control message (or control information message) addressed to the user device. The transmitter 104 of the network node 100 is configured to transmit a first control signal CS1 to each of the plurality of user devices, and the first control signal CS1 indicates the determined corresponding check element position(s). The processor 102 is further configured to compose a control message M addressed to at least two user devices 300a, . . . , 300z (not shown in FIG. 1 but shown in FIG. 5) of the plurality of user devices by generating for each of the at least two user devices 300a, . . . , 300z a corresponding check element based on control information d and the identity $i_z$ of the user device, and by appending the generated check elements to the control information d in dependence on their determined corresponding check element position. The transmitter 104 is further configured to transmit the control message M to the at least two user devices 300a, . . . , 300z in a wireless communication system 500.

The present network node 100 may be a radio network node, an access node or an access point or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

FIG. 2 shows a corresponding method 200. The method 200 may be executed in a network node 100, such as the one shown in FIG. 1. The method 200 comprises the step 202 of determining for each of the plurality of user devices a corresponding check element position of a corresponding check element in a control message addressed to the user device. The method 200 further comprises the step 204 of transmitting a first control signal CS1 to each of the plurality of user devices. The first control signal CS1 indicating the determined corresponding check element position. The method 200 further comprises the step 206 of composing a control message M addressed to at least two user devices 300a, . . . , 300z of the plurality of user devices by generating for each of the at least two user devices 300a, . . . , 300z a corresponding check element based on control information d and the identity $i_z$ of the user device, and by appending the generated check elements to the control information (d) in dependence on their determined corresponding check element position. The method 200 finally comprises the step 208 of transmitting the control message to the at least two user devices 300a, . . . , 300z.

Figure 3:
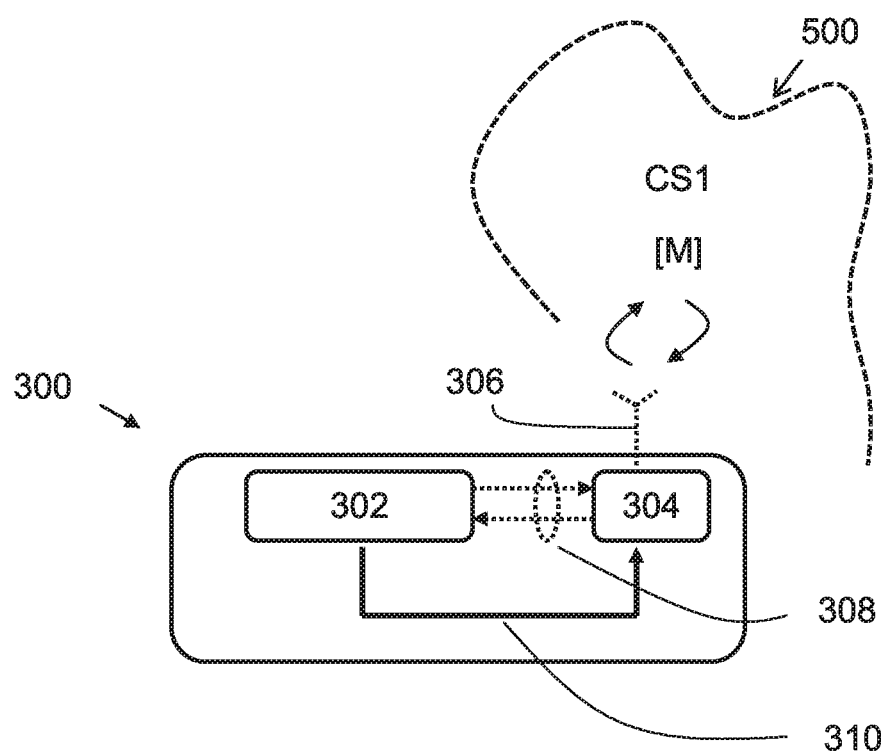
FIG. 3 shows a user device according to an embodiment of the present invention.

FIG. 3 shows a user device 300 according to an embodiment of the present invention. The user device 300 comprises a processor 302 which is communicably coupled with communication means 308 to a receiver 304 in this exemplary embodiment. The communication means 308 are illustrated as dotted arrows between the processor 302 and the receiver 304 in FIG. 3. The communication means 308 are according to techniques well known in the art. The communication means 308 may e.g. be used for transfer of data or control signaling between the processor 302 and the receiver 304. The user device 300 in this particular embodiment further comprises control means 310 by which the processor 302 operates (or controls) the receiver 304. The control means are illustrated with the arrow from the processor 302 to the receiver 304. The user device 300 also comprises antenna means 306 coupled to the receiver 304 for reception in the wireless communication system 500. Optionally, the receiver 304 may be part of a transceiver for reception and transmissions in the wireless communication system 500, which is illustrated in the embodiment in FIG. 3.

According to the present solution, the receiver 304 of the user device 300 is configured to receive a first control signal CS1 indicating a corresponding check element position of a check element associated with the user device 300 in a control message M. The control message M comprises control information d and at least two check elements. The processor 302 of the user device 300 is configured to derive the corresponding check element position of the check element associated with the user device 300 from the first control signal CS1. The receiver 304 is further configured to receive the control message M. The processor 302 is further configured to perform a redundancy check on the control message M based on the derived corresponding check element position, derive the control information d from the control information message M upon a positive redundancy check and to communicate in the wireless communication system 500 based on the derived control information d.

In one embodiment the processor 302 of the user device 300 is configured to perform check element detection by computing a redundancy check on the control information message based on the derived corresponding check element position. The processor 302 of the user device 300 sequentially processes the bits of the control information comprised in the control message M by starting from the leftmost bit of the control information=$(d_1, \ldots, d_N)$. Each bit $d_i$ is fed into a check element check device or a CRC check device (not shown). Once all bits of the control information have been fed into the check element check device or CRC check device, said device computes a W-bit test check element as a function of the bits previously fed to its input and of the identity $i_z$ of the user device. When the W-bit test check element computed by the processor coincides with the W bits in the received control message corresponding to the derived check element position for the user device 300, a check element is detected in the received control message, a check pass is declared and the check element detection procedure is terminated. Otherwise, the control information message is discarded.

In one embodiment of the present invention, the present user device 300 may be any of a User Equipment (UE), mobile station (MS), wireless terminal or mobile terminal being enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Figure 4:
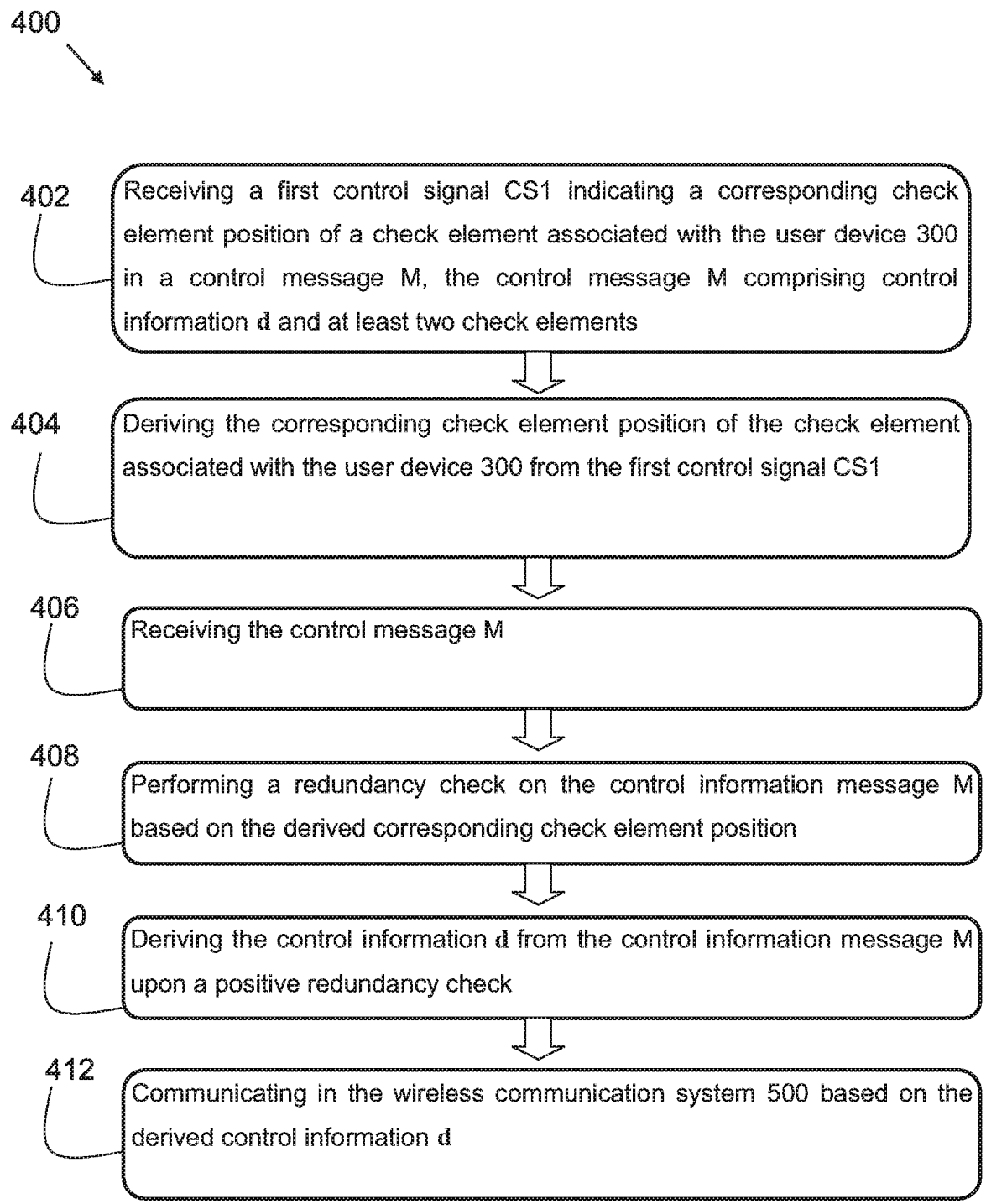
FIG. 4 show a method according to an embodiment of the present invention.

FIG. 4 shows a corresponding method 400. The method 400 may be executed in a user device 300, such as the one shown in FIG. 3. The method 400 comprises the step 402 of receiving a first control signal CS1 indicating a corresponding check element position of a check element associated with the user device 300 in a control message M. The control message M comprising control information d and at least two check elements. The method 400 further comprises the step 404 deriving the corresponding check element position of the check element associated with the user device 300 from the first control signal CS1. The method 400 further comprises the step 406 receiving the control message M. The method 400 further comprises the step 408 performing a redundancy check on the control information message M based on the derived corresponding check element position. The method 400 further comprises the step 410 deriving the control information d from the control information message M upon a positive redundancy check. The method 400 finally comprises the step 412 communicating in the wireless communication system 500 based on the derived control information d.

Figure 5:
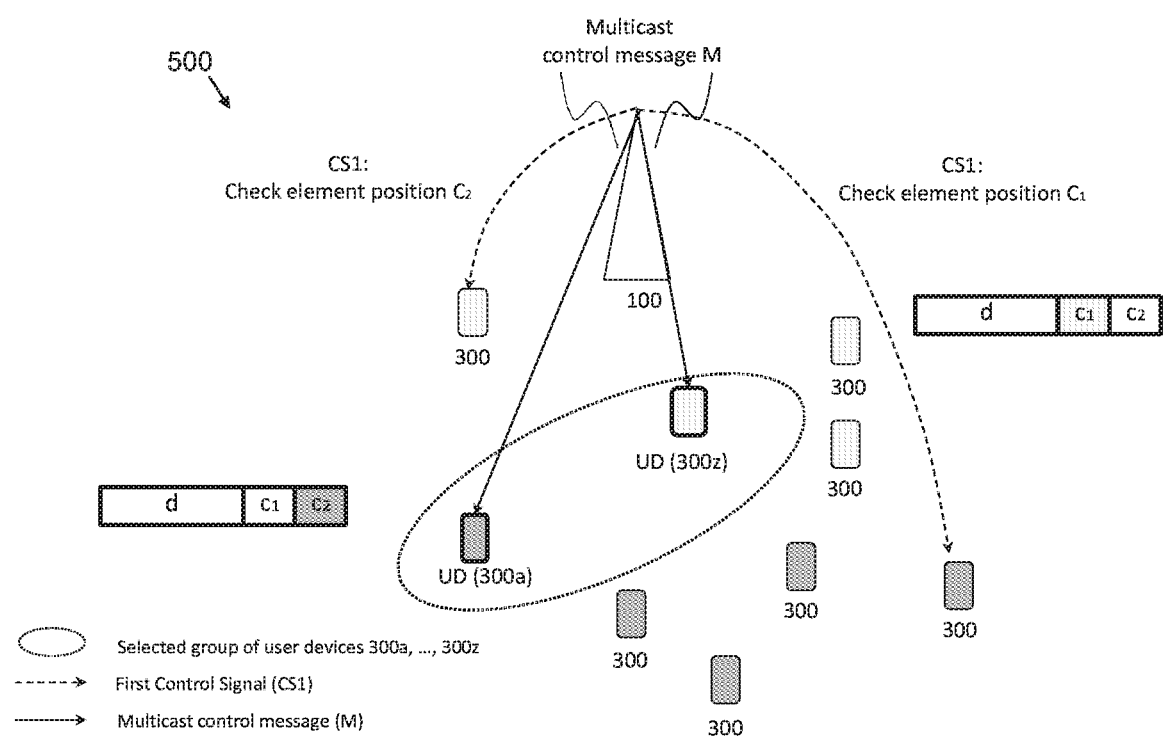
FIG. 5 shows an embodiment of the present invention.
Figure 6:
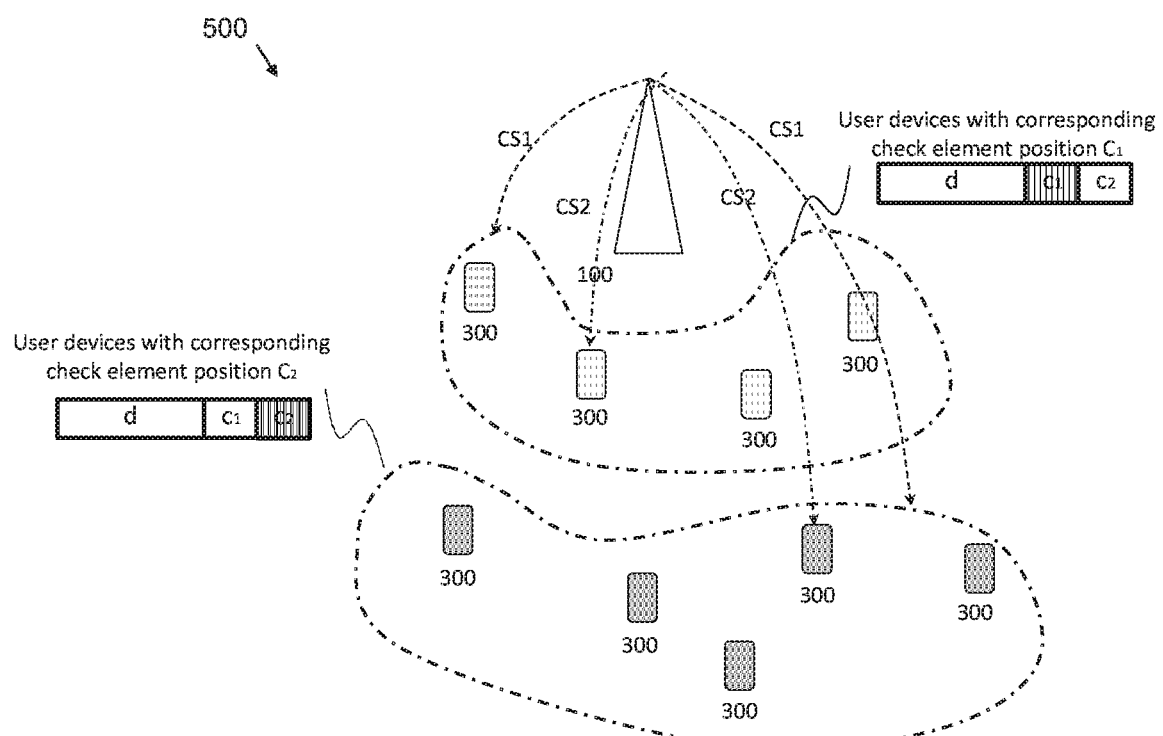
FIG. 6 shows a further embodiment of the present invention.

FIG. 5 shows an embodiment of the present invention. The network node 100 determines, for a plurality of User Devices (UDs) (each user device has reference numeral 300 in FIG. 5), a corresponding check element position of a corresponding check element in a control message M, wherein the control message M comprises at least two check elements. The present control message M comprises two check element positions $c_1$ and $c_2$, respectively, in this particular case. The transmitter 104 of the network node 100 is configured to transmit a first control signal CS1 (dashed arrows) to each of the plurality of user devices, indicating the determined corresponding check element position as shown in FIG. 5. Thereby, in this particular case, the network node 100 implicitly partitions the plurality of user devices into two groups, wherein each group of user devices being configured with a corresponding check element position of a corresponding check element in a control message M. FIG. 6 further illustrates this partitioning, wherein the partitioning is semi-static. One group of user devices are marked with dots and are configured with corresponding check element position $c_1$ while the other group of user devices are marked with diagonal lines and are configured with corresponding check element position $c_2$ in FIG. 5.

The processor 102 is further configured to compose a control message M addressed to at least two user devices $300a, \ldots, 300z$ among the plurality of user devices with different corresponding check element positions $c_1$ and $c_2$, respectively. The at least two user devices $300a, \ldots, 300z$ are shown in the dotted ring in FIG. 5. For each of the at least two user devices $300a, \ldots, 300z$ a corresponding check element is generated based on control information d and the identity $i_z$ of the user device, and by appending the generated check elements to the control information d in dependence on their determined corresponding check element position. The transmitter 104 is further configured to transmit the control message M (filled arrows) to the at least two user devices $300a, \ldots, 300z$ in a wireless communication system 500.

FIG. 6 shows a wireless communication system 500 according to a further embodiment of the present invention. The wireless communication system 500 in this particular example comprises a network node 100 and a plurality of user devices (each user devices has reference numeral 300 in FIG. 6). The network node 100 determines the same corresponding check element position for each group of user devices of the plurality of user devices. In this example, the control message M comprises two check element positions and the network node 100 determines a first group of user devices with corresponding check element position $c_1$ and a second group of user devices with corresponding check element position $c_2$ of the plurality of user devices. As in FIG. 5, one group of user devices are marked with dots and are configured with corresponding check element position $c_1$ while the other group of user devices are marked with diagonal lines and are configured with corresponding check element position $c_2$ in FIG. 6. The association of a group of user devices with a corresponding check element position is signaled with a first control signal CS1. When the first control signal CS1 is a higher layer Radio Resource Control (RRC) signal, the association of a group of user devices with a corresponding check element position is semi-static, i.e. it lasts until a new association with different corresponding check element position is received. Furthermore, the network node 100 composes each control message M such that each user device addressed by the control message M has different corresponding check element position.

In one exemplifying case, the semi-static partitioning of the plurality of user devices, as shown in FIG. 5 and FIG. 6, can be used to distinguish the so called near-users (i.e., user devices with SINR above a threshold or pathloss below a threshold) and far-users (i.e., user devices with SINR below a threshold or pathloss above a threshold). Therefore, according to this and previous embodiments, at least two user devices comprising a near-user and a far-user can be dynamically selected (e.g., on a TTI basis) and simultaneously addressed by a multicast control message M. In the examples in FIG. 5 and FIG. 6 the group of user devices marked with dots are near-users while the other group of user devices marked with diagonal lines are far-users. More generally, the plurality of user devices can be partitioned into a number $Z \geq 2$ groups of user device according to an embodiment of the invention, wherein Z corresponds to the number of check element positions available in a control message M. Therefore, according to a further embodiment of the present invention the network node 100 select the group(s) of user devices of the plurality of user devices based on the radio channel properties including one or more of: the signal-to-noise ratio (SNR), signal-to-noise and interference ratio (SINR), propagation loss, signal-to-leakage and noise ratio, and received signal strength.

In one exemplifying case, the network node 100 selects the group of user devices of the plurality of user devices by using thresholds related to the radio channel properties. FIG. 5 and FIG. 6 show an exemplifying case wherein the multicast control message comprises two check element positions (i.e., Z=2), thereby the control message M is multicast to two user devices simultaneously. In this example, the network node 100 semi-statically partitions a plurality of user devices into two groups of user devices: a first a group of user devices with corresponding check element position $c_1$ such as user devices with a certain radio channel property is above or below a threshold. For instance, the network node 100 can determine a first group of user devices comprising user devices with signal-to-noise and interference ratio above a threshold and a second group of user devices comprising user devices with signal-to-noise and interference ratio below a threshold (not necessarily the same threshold). Similarly, a group of user devices can be formed using the signal-to-noise ratio, propagation loss, signal-to-leakage and noise ratio, and received signal strength.

According to an embodiment of the present invention the network node 100 also determines a group common identity for a group of user devices and transmits a second control signal denoted CS2 to each user device in a group of user devices indicating the group common identity. Thereby, a group of user devices can be semi-statically configured with a group common identity, e.g. a RNTI in LTE systems. Such group common identity can be unicast-transmitted to the user devices in the group through higher layer Radio Resource Control (RRC) signaling or through another control channel, such as PDCCH or EPDCCH in the LTE system. After receiving the group common identity, all user devices in a group can be configured with a corresponding check element position upon receiving a first control signal CS1, wherein the first control signal CS1 has been transmitted based on the group common identity.

Figure 7:
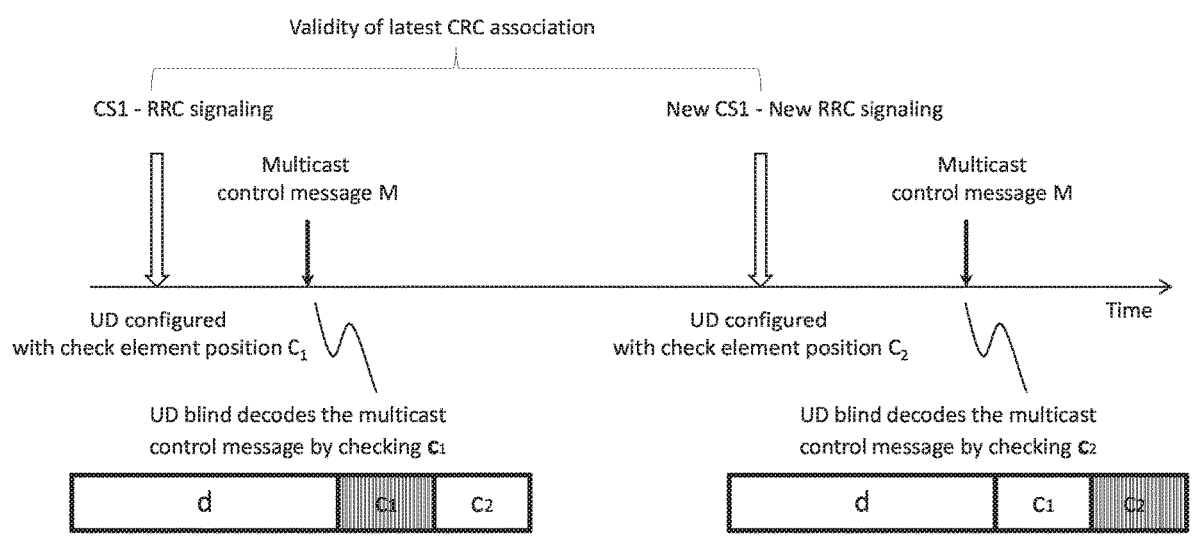
FIG. 7 shows more in detail signaling aspects of embodiments of the present invention.

FIG. 7 illustrates and exemplifies when the network node 100 transmits a first control signal CS1 via higher layer RRC signaling to a plurality of user devices comprising the corresponding check element position to be used in control message M. Upon receiving the first control signal CS1, a user device (a UD in FIG. 7) such as a user equipment (UE) in LTE terms is configured to detect control messages M using the corresponding check element position of a corresponding check element in the control message M as indicated by the first control signal CS1. The user device (UD) maintains the configuration until a new first control signal CS1 is received indicating a different corresponding check element position. From the reception of the first control signal CS1 any received multicast control message M will be detected based on the corresponding check element position indicated by the first control signal CS1. It should be noted that a user device 300 may be configured to read and detect different formats of the control message M (e.g., different formats may comprise different number of check element positions) by means of different first control signals CS1.

Therefore, according to an embodiment of the present invention, the network node 100 configures a user device 300 with a corresponding check element position within a multicast control message M (e.g., a multicast DCI format in the LTE system). The user device 300 shall use the corresponding check element position for performing a redundancy check when detecting a multicast control message M. The user device 300 is configured by a configuration message in a first control signal CS1 by means of either physical layer control signaling (e.g., PDCCH or EPDCCH) or via higher layer Radio Resource Control (RRC) signaling. The control message M associates each user device 300 with one out of the Z check element positions available within a multicast control message M (e.g., a multicast DCI format in the LTE system). This information can be indicated, for example, with a Z-bit bitmap or with $[\log_e (Z)]$ bits within the first control message CS1.

Thereby embodiments of the present invention have the effect of semi-statically partitioning a plurality of user devices in the wireless communication system 500 into up to Z number of groups, where user devices in one partition are configured with at least one corresponding check element position of a multicast control message M. User devices belonging to different partitions are, according to this embodiment, configured with different check element positions in a multicast control message M. Therefore, at least two user devices belonging to different semi-static groups can be dynamically selected, e.g. on a Transmission Time Interval (TTI) basis etc., to receive a multicast control message M. The at least two user devices can be selected, for instance, upon scheduling decisions, for superposed transmission or reception of data channel, Multi-User MIMO transmission (MU-MIMO), etc. Therefore, the control information d for at least two user devices dynamically selected on a TTI basis can be transmitted to the user devices according to previous embodiments.

One relevant use case is that of non-orthogonal multiple access based on superposition coding or similar techniques, wherein a number Z≥2 of user devices are dynamically scheduled on a TTI basis to receive or transmit data channel in the same or overlapping radio resources. In this case, the allocation of radio resources, the modulation scheme, and/or other parameters could be common to all user devices addressed by a control message M and being transmitted only once (multicast). At the same time, an indication of downlink transmission power split among superimposed signals, the allocation of modulation bits to a user device, or other parameters can be user device specific information. In combination with previous embodiments, the proposed method enables to significantly reduce the signaling overhead. For example, with a multicast control message M addressing Z number of user devices, Z−1 fields could be used to indicate Z downlink transmission power split corresponding to the user devices addressed by the control information. Similarly, Z−1 fields could be used to indicate Z allocation of modulation bits corresponding to the user devices addressed by the control information.

In a further example, this semi-static user partitioning can be used for MU-MIMO transmission where at least two user devices are concurrently served in the same or overlapping frequency resources by means of spatial separation in the antenna domain. The skilled person can recognize that the described user device partitioning and the associated configuration of check element field within a multicast control message M can be extended to an arbitrary number of partitions of user devices and number of check element fields within a multicast control message M.

According to an embodiment of the present invention, the network node 100 determines the same corresponding check element position for a first user device and a second user device and composes a first control information message M addressed to the first user device and at least one third user device having a different corresponding check element position compared to the first user device. Furthermore, the network node composes a second control information message M addressed to the second user device and at least one fourth user device having a different corresponding check element position compared to the second user device. The network node 100 transmits the first control information message M and the second control information message M using different radio resources. Therefore, radio resources for the first control information message and the second control information message do not collide. For example orthogonal radio resources could be used in time and/or frequency. Also orthogonal codes could be used in this respect.

According to an embodiment of the present invention, the $z^{th}$ check element (e.g. a CRC code word) $c_z$ for the $z^{th}$ user device 300z is computed as $$c_z=CRC(d;i_z)$$

where $i_z$ is the user device identity of the $z^{th}$ user device.

Therefore, the network node 100 generates the check element for each of at least two user devices 300a, ..., 300z based on control information d and the identity $i_z$ of the user device, but independent on the check elements for the other user devices. The network node 100 further composes the control message M addressed to the at least two user devices 300a, ..., 300z by appending the generated check elements to the control information d in dependence on their determined corresponding check element position. Additionally, according to one embodiment of the present invention, user device 300 receives a control message M and performs a redundancy check on the control information message M based on the identity $i_z$ of the user device 300, the control information in the control information message M, and the corresponding check element position for the user device 300.

According to an embodiment of the present invention, the $z^{th}$ check element for the $z^{th}$ user device 300z is computed as $$c_z=CRC(d,c_1,\ldots,c_{z-1};i_z)$$

where $i_z$ is the user device identifier of the $z^{th}$ user device. Therefore, according to this embodiment the network node 100 generates the check element for each of at least two user devices 300a, ..., 300z based on the identity $i_z$ of the user device, the control information d, and check elements (for other user devices to which the control message is addressed to) in the control information message M prior to the check element for the user device. In addition, the user device is configured to perform a redundancy check. Additionally, according to an embodiment of the present invention, a user device 300 receives the control message M and performs a redundancy check on the control information message M based on the corresponding check element position for user device 300, the identity $i_z$ of the user device 300, and all control information and check elements in the control information message M prior to the check element associated with the user device 300.

A first user device will successfully detect the control message M after the last bit of the check element for the first user device $c_1$ has been processed, and then the first user device will read the control information d. In order to reduce the blind decoding attempts that have to be performed, the first user device may skip the W(Z−1) bits following $c_1$ before starting to process the next control message M. To this purpose, it may be convenient to add a field to the control message M containing the number of user devices the current control message M is addressed to in the control message's M data field.

For embodiments in which the check element for a user device is calculated independent of further check elements for other user devices addressed in the control message, blind detection of the control message M length has to take into account that there may be a gap between the end of control information d and the beginning of its own check element. After discarding the check elements in the gap and check element check, the user device will read control information d and possibly skip the remaining W(Z−z) bits.

In an embodiment of the invention, the control information d comprises common control information $d_c$ and user specific control information $d_1, \ldots, d_Z$, respectively, for totally Z number of user devices. The total length of the control message is N+(P+W)×Z bits where N is length of the common control information and P is the length of the user device specific control information. Here P is assumed to be the same to all user devices but it is not difficult to extend to the case that each user device, of the at least two user devices, has predefined different length of the user specific control information compared to the length of the user specific control information for other user devices. If the length of the common control information $d_c$ and allocation of each specific user device specific control information allocation is known to the corresponding user device, the $z^{th}$ check element $c_z$ is computed as $$c_z=CRC(d_c,d_z;i_z)$$

where $i_z$ is the identity of the $z^{th}$ user device. Thereby the blind detection can be correspondingly attempted by taking the corresponding $d_c$, $d_z$, and $c_z$ in the received total N+(P+W)×Z bits. The sequence and allocation of the control information $d_c$, $d_1$, ..., $d_Z$ in the data field of the control message M can be predefined in any format known to both transmitter (network node 100) and receivers (user devices). It is not difficult to extend to the case that each user device, of the at least two user devices, has predefined different length of the user specific control information compared to the length of the user specific control information for other user devices.

According to an embodiment of the present invention, the control information d comprises any of common control information $d_c$ for the at least two user devices 300a, ..., 300z and user device specific control information $d_z$ for at least one user device of the at least two of user devices 300a, ..., 300z. The common control information $d_c$ refers to control information common to the user devices addressed by the multicast control message M. User device specific control information $d_z$ refers to control information intended for individual user devices addressed by the multicast control message. The advantage of this embodiment is to reduce the control signaling overhead compared to the case in which the control information d is transmitted by means of separate unicast control messages.

Figure 8:
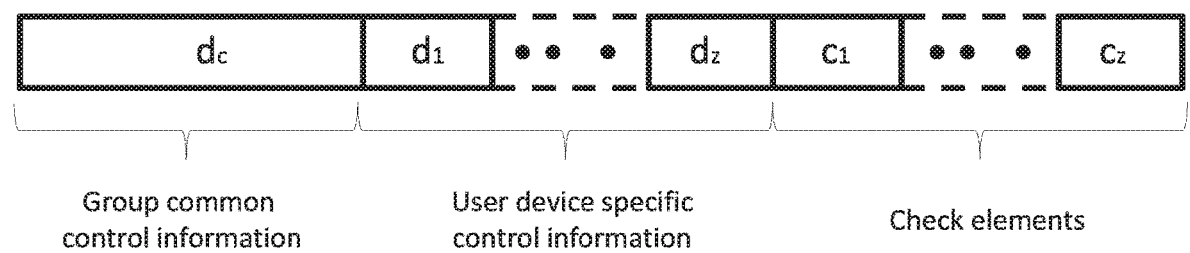
FIG. 8 shows an exemplary control information message.

FIG. 8 illustrates a control message M having user device specific control information $d_z$ for totally Z user devices appended to common control information $d_c$. The control message M further comprises check elements for each of the user devices appended to the user device specific control information $d_z$ for all users.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present network node 100 and user device 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present network node 100 and user device 300 comprises, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A network node, comprising:
a processor, configured to determine, for each of a plurality of user devices, a corresponding check element position of a corresponding check element in a single control information message addressed to the respective user device, wherein the determined corresponding check element positions are bitmaps or bit offset positions with respect to a common bit reference position; and
a transmitter, configured to transmit a first control signal (CS1) to each of the plurality of user devices in a same time-frequency radio resource, each first control signal (CS1) indicating the determined corresponding check element position;
wherein the processor is further configured to compose the single control information message (M) addressed to at least two user devices of the plurality of user devices, wherein the single control information message (M) comprises, for each of the at least two user devices, the corresponding check element which is generated based on control information (d) and an identity ($i_z$) of the respective user device, and wherein each generated corresponding check element is appended to the control information (d) in dependence on its corresponding determined corresponding check element position in the single control information message (M), and wherein the at least two user devices comprise user devices selected for multiuser superposed transmission or reception of a data channel in a common set or in an overlapping set of time and frequency resources; and
wherein the transmitter is further configured to transmit the single control information message (M) to the at least two user devices.

2. The network node according to claim 1, wherein the processor is further configured to:
determine the same corresponding check element position for a group of user devices; and
compose the single control information message (M) such that each user device addressed by the single control information message (M) has a different corresponding check element position.

3. The network node according to claim 2, wherein the processor further is configured to:
select the group of user devices from the plurality of user devices based on radio channel properties, the radio channel properties including: signal-to-noise ratio, signal-to-noise and interference ratio, propagation loss, signal-to-leakage and noise ratio, and received signal strength.

4. The network node according to claim 2, wherein the processor is further configured to determine a group common identity for the group of user devices; and
wherein the transmitter is further configured to
transmit a second control signal (CS2) to at least one user device of the group of user devices, the second control signal (CS2) indicating the group common identity; and
transmit the first control signal (CS1) to at least one user device of the group of user devices based on the group common identity.

5. The network node according to claim 3, wherein the processor further is configured to:
select the group of user devices from the plurality of user devices by using thresholds related to the radio channel properties.

6. The network node according to claim 1, wherein:
the processor being configured to determine, for each of the at least two user devices, the corresponding check element position of the corresponding check element in the single control information message (M) addressed to the at least two user devices comprises the processor being configured to:
determine a same corresponding check element position for a first user device and a second user device;
the processor being configured to compose the single control information message (M) addressed to the at least two user devices comprises the processor being configured to:
compose a first single control information message (M) addressed to the first user device and at least one third user device having a different corresponding check element position than the first user device; and
compose a second single control information message (M) addressed to the second user device and at least one fourth user device having a different corresponding check element position than the second user device; and
the transmitter being configured to transmit the single control information message (M) to the at least two user devices comprises the transmitter being configured to:

transmit the first single control information message (M) and the second single control information message (M) using different radio resources.

7. The network node according to claim 1, wherein the processor further is configured to:
generate the check element for each of the at least two of user devices based on an identity ($i_z$) of the user device, the control information (d), and check elements in the single control information message (M) prior to the check element for the user device.

8. The network node according to claim 1, wherein control information (d) comprises any of common control information ($d_c$) for the at least two user devices and user device specific control information ($d_z$) for at least one user device of the at least two of user devices.

9. The network node according to claim 8, wherein the processor further is configured to:
generate the check element for each of the at least two user devices based on the identity of the user device and any of the common control information ($d_c$) and the user device specific control information ($d_z$).

10. A user device, comprising:
a receiver, configured to receive a first control signal (CS1) indicating a check element position of a corresponding check element associated with the user device in a single control information message (M), wherein the first control signal (CS1) is sent to each of a plurality of user devices in a same time-frequency radio resource, and each first control signal (CS1) indicates a determined corresponding check element position corresponding to the user device that receives the respective first control signal (CS1), and wherein the determined corresponding check element positions are bitmaps or bit offset positions with respect to a common bit reference position; and
a processor, configured to derive the corresponding check element position of the check element associated with the user device from the received first control signal (CS1);
wherein the receiver further is configured to receive the single control information message (M), the single control information message (M) comprises control information (d) and at least two check elements, and wherein the at least two check elements correspond to at least two user devices; and
wherein the processor further is configured to:
perform a redundancy check on the single control information message (M) based on the derived corresponding check element position;
derive the control information (d) from the single control information message (M) upon a positive redundancy check; and
communicate in a wireless communication system based on the derived control information (d).

11. The user device according to claim 10, wherein the processor further is configured to:
derive any of common control information ($d_c$) for the plurality of user devices and user device specific control information ($d_z$) for the user device comprised in the control information (d).

12. The user device according to claim 10, wherein the receiver further is configured to receive a second control signal (CS2) indicating a group common identity for a group of user devices, the user device being comprised in the group of user devices; and wherein the processor further is configured to:
derive the group common identity for a group of user devices from the second control signal (CS2); and
derive the corresponding check element position of the check element associated with the user device in the single control information message (M) from the first control signal (CS1) based on the derived group common identity.

13. The user device according to claim 10, wherein the processor further is configured to:
perform the redundancy check on the single control information message (M) based on the identity ($i_z$) of the user device, the control information in the single control information message (M), and the corresponding check element position for the user device.

14. The user device according to claim 10, wherein the processor further is configured to perform the redundancy check on the single control information message (M) based on the corresponding check element position for the user device, the identity ($i_z$) of the user device, and all control information and check elements in the single control information message (M) prior to the check element associated with the user device.

15. A method, comprising:
determining, for each of a plurality of user devices, a corresponding check element position of a corresponding check element in a single control information message addressed to the respective user device;
transmitting a first control signal (CS1) to each of the plurality of user devices in a same time-frequency radio resource, each first control signal (CS1) indicating the determined corresponding check element position, wherein the determined corresponding check element positions are bitmaps or bit offset positions with respect to a common bit reference position;
composing the single control information message (M) addressed to at least two user devices of the plurality of user devices, wherein the single control information message (M) comprises, for each of the at least two user devices, the corresponding check element which is generated based on control information (d) and an identity ($i_z$) of the respective user device, and wherein each generated corresponding check element is appended to the control information (d) in dependence on its corresponding determined corresponding check element position in the single control information message (M), and wherein the at least two user devices comprise user devices selected for multiuser superposed transmission or reception of a data channel in a common set or in an overlapping set of time and frequency resources; and
transmitting the single control information message (M) to the at least two user devices.

16. A non-transitory computer readable storage medium comprising a computer program with a program code for performing a method according to claim 15 when the computer program runs on a computer.

17. The method according to claim 15, further comprising:
receiving a first control signal (CS1) indicating a corresponding check element position of a check element associated with a first user device in a single control information message (M), the single control information message (M) comprising the control information (d) and at least two check elements;

deriving the corresponding check element position of the check element associated with the first user device from the first control signal (CS1);

receiving the single control information message (M);

performing a redundancy check on the single control information message (M) based on the derived corresponding check element position;

deriving the control information (d) from the single control information message (M) upon a positive redundancy check; and communicating in a wireless communication system based on the derived control information (d).

18. A non-transitory computer readable storage medium comprising a computer program with a program code for performing a method according to claim 17 when the computer program runs on a computer.

* * * * *